(12) United States Patent
Ganesan et al.

(10) Patent No.: US 8,225,083 B2
(45) Date of Patent: *Jul. 17, 2012

(54) SECURED SEEDING OF DATA IN A DISTRIBUTED ENVIRONMENT

(75) Inventors: Prasanna Ganesan, Menlo Park, CA (US); Andrew M. Goodman, Portola Valley, CA (US)

(73) Assignee: VUDU, Inc., Santa Clara, CA (US)

( * ) Notice: Subject to any disclaimer, the term of this patent is extended or adjusted under 35 U.S.C. 154(b) by 1285 days.

This patent is subject to a terminal disclaimer.

(21) Appl. No.: 11/351,841

(22) Filed: Apr. 11, 2006

(65) Prior Publication Data

US 2009/0024846 A1 Jan. 22, 2009

Related U.S. Application Data

(63) Continuation-in-part of application No. 11/076,334, filed on Mar. 9, 2005, now Pat. No. 7,627,888.

(51) Int. Cl.
*H04L 29/06* (2006.01)

(52) U.S. Cl. ........ 713/150; 713/153; 713/160; 713/162; 713/163; 713/193; 713/194; 725/31; 725/118; 725/80; 726/29

(58) Field of Classification Search .................... 713/182
See application file for complete search history.

(56) References Cited

U.S. PATENT DOCUMENTS

| | | | |
|---|---|---|---|
| 5,253,275 A | 10/1993 | Yurt et al. | |
| 5,410,343 A | 4/1995 | Coddington et al. | |
| 5,657,072 A | 8/1997 | Aristides et al. | |
| 5,666,645 A | 9/1997 | Thomas et al. | |
| 5,751,883 A | 5/1998 | Ottesen et al. | |
| 5,790,176 A | 8/1998 | Craig | |
| 5,928,331 A | 7/1999 | Bushmitch | |
| 6,170,014 B1 | 1/2001 | Darago et al. | |
| 6,263,504 B1 | 7/2001 | Ebisawa | |
| 6,412,112 B1 | 6/2002 | Barrett et al. | |
| 6,505,240 B1 | 1/2003 | Blumenau | |
| 6,697,489 B1 * | 2/2004 | Candelore | 380/200 |
| 6,701,528 B1 | 3/2004 | Arsenault et al. | |
| 6,889,385 B1 * | 5/2005 | Rakib et al. | 725/119 |
| 6,996,627 B1 | 2/2006 | Carden | |
| 7,039,784 B1 | 5/2006 | Chen et al. | |
| 7,143,089 B2 | 11/2006 | Petras et al. | |
| 7,339,954 B2 | 3/2008 | Futamata | |
| 7,404,201 B2 | 7/2008 | Takeuchi et al. | |
| 7,627,888 B2 * | 12/2009 | Ganesan et al. | 725/92 |
| 2001/0016836 A1 | 8/2001 | Boccon-Gibod et al. | |
| 2003/0065947 A1 * | 4/2003 | Song et al. | 713/201 |

(Continued)

OTHER PUBLICATIONS

U.S. Appl. No. 11/611,152, filed Dec. 15, 2006, Ganesan et al.

(Continued)

*Primary Examiner* — Nathan Flynn
*Assistant Examiner* — Bryan Wright
(74) *Attorney, Agent, or Firm* — Mahamedi Paradice Kreisman LLP

(57) ABSTRACT

Techniques for seeding data among client machines, also referred to as boxes herein, are disclosed. To prevent the data distributed among the boxes from being illegitimately accessed or possessed, according to one aspect of the present invention, each box is configured to perform what is referred to herein as a transcription process. In other words, when encrypted data is received, the data is decrypted and then re-encrypted with a key agreeable with a next box configured to receive the data.

10 Claims, 7 Drawing Sheets

U.S. PATENT DOCUMENTS

| | | | |
|---|---|---|---|
| 2003/0145329 A1* | 7/2003 | Candelore | 725/87 |
| 2003/0217362 A1* | 11/2003 | Summers et al. | 725/63 |
| 2004/0083489 A1 | 4/2004 | Bansal et al. | |
| 2004/0128343 A1 | 7/2004 | Mayer | |
| 2004/0237100 A1* | 11/2004 | Pinder et al. | 725/31 |
| 2004/0266336 A1 | 12/2004 | Patsiokas et al. | |
| 2005/0097598 A1* | 5/2005 | Pedlow et al. | 725/31 |
| 2005/0193415 A1 | 9/2005 | Ikeda | |
| 2006/0020962 A1 | 1/2006 | Stark et al. | |
| 2006/0041905 A1* | 2/2006 | Wasilewski | 725/31 |
| 2006/0206609 A1 | 9/2006 | Ganesan et al. | |
| 2006/0218218 A1 | 9/2006 | Ganesan et al. | |
| 2006/0218219 A1 | 9/2006 | Ganesan et al. | |
| 2006/0218220 A1 | 9/2006 | Ganesan et al. | |
| 2006/0218605 A1 | 9/2006 | Hirao et al. | |
| 2007/0033419 A1* | 2/2007 | Kocher et al. | 713/193 |
| 2007/0118770 A1* | 5/2007 | Kahn et al. | 713/193 |
| 2008/0163304 A1 | 7/2008 | Ellis | |
| 2008/0263599 A1 | 10/2008 | Knudson et al. | |
| 2009/0031424 A1 | 1/2009 | Ganesan et al. | |

OTHER PUBLICATIONS

Final Office Action dated Jan. 12, 2009 in U.S. Appl. No. 11/076,343, 11 pgs.

Non-Final Office Action dated Dec. 12, 2008 in U.S. Appl. No. 11/076,262, 11 pgs.

Non-Final Office Action dated Jul. 22, 2008 in U.S. Appl. No. 11/076,343, 9 pgs.

Non-Final Office Action dated Feb. 5, 2009 in U.S. Appl. No. 11/661,152, 10 pgs.

Non-Final Office Action dated Feb. 5, 2009 in U.S. Appl. No. 11/076,401, 16 pgs.

Non-Final Office Action dated Jan. 9, 2009 in U.S. Appl. No. 11/076,334, 11 pgs.

Final Office Action dated Jun. 23, 2009 in U.S. Appl. No. 11/076,262, 12 pgs.

Non-Final Office Action dated Jul. 31, 2009 in U.S. Appl. No. 11/076,343, 11 pgs.

Non-Final Office Action dated Apr. 1, 2009 in U.S. Appl. No. 11/351,812, 13 pgs.

Non-Final Office Action dated Feb. 5, 2009 in U.S. Appl. No. 11/611,152, 10 pgs.

Notice of Allowance dated Mar. 22, 2010 in U.S. Appl. No. 11/076,343, 14 pgs.

Notice of Allowance dated Jul. 24, 2009 in U.S. Appl. No. 11/076,334, 7 pgs.

Non-Final Office Action dated May 24, 2010 in U.S. Appl. No. 11/076,262, 13 pgs.

* cited by examiner

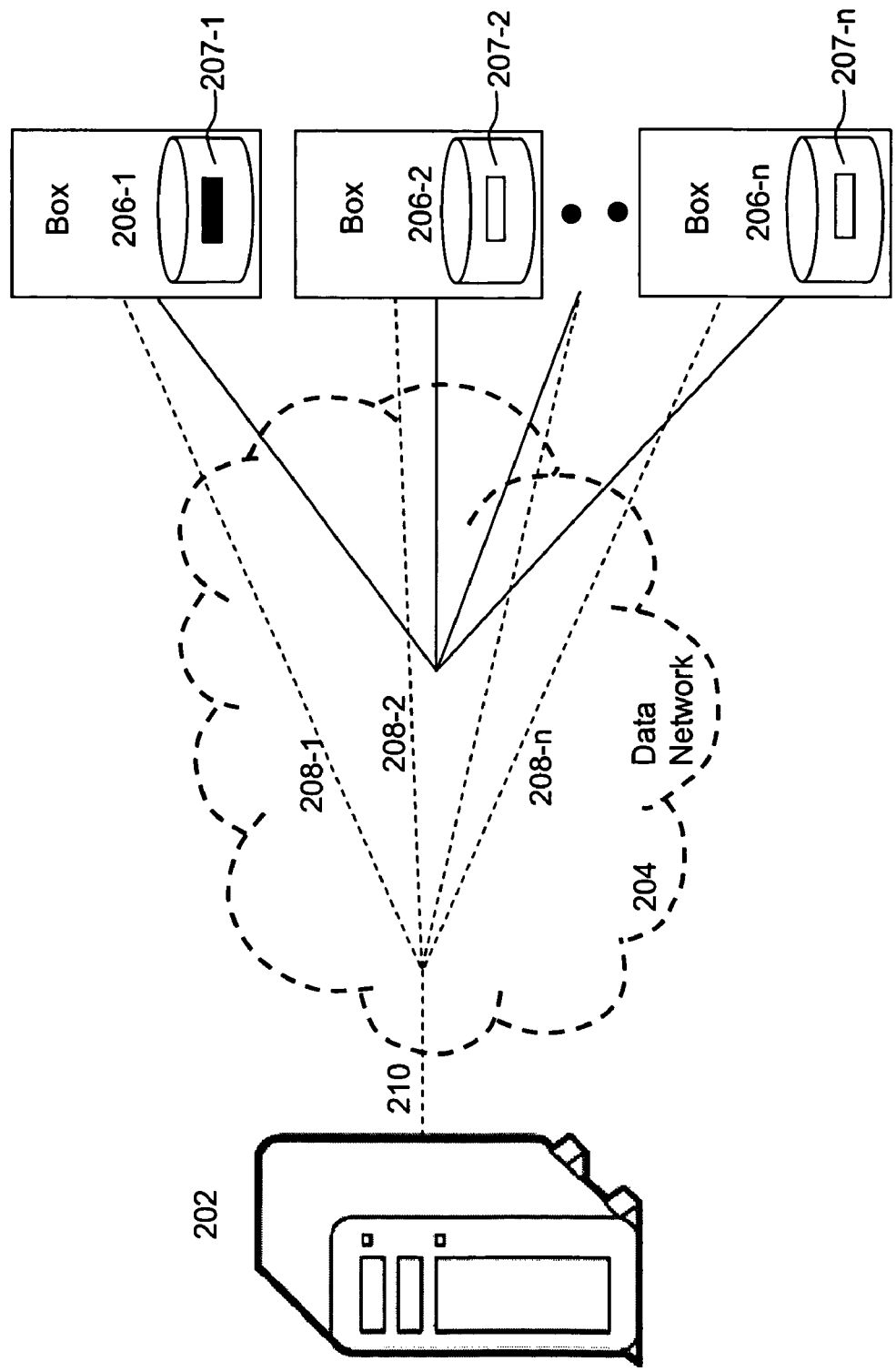

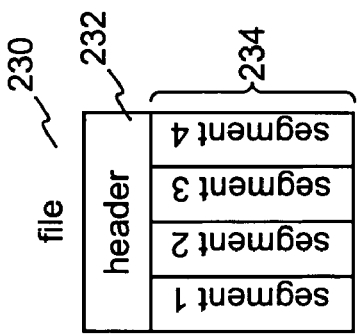
FIG. 2B
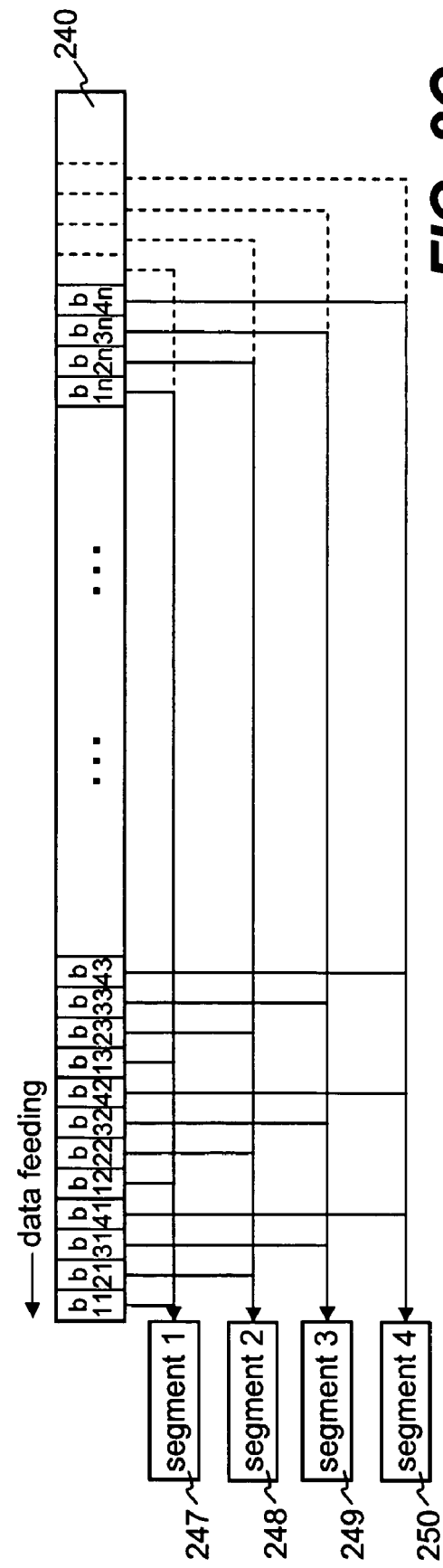
FIG. 2A
FIG. 2C

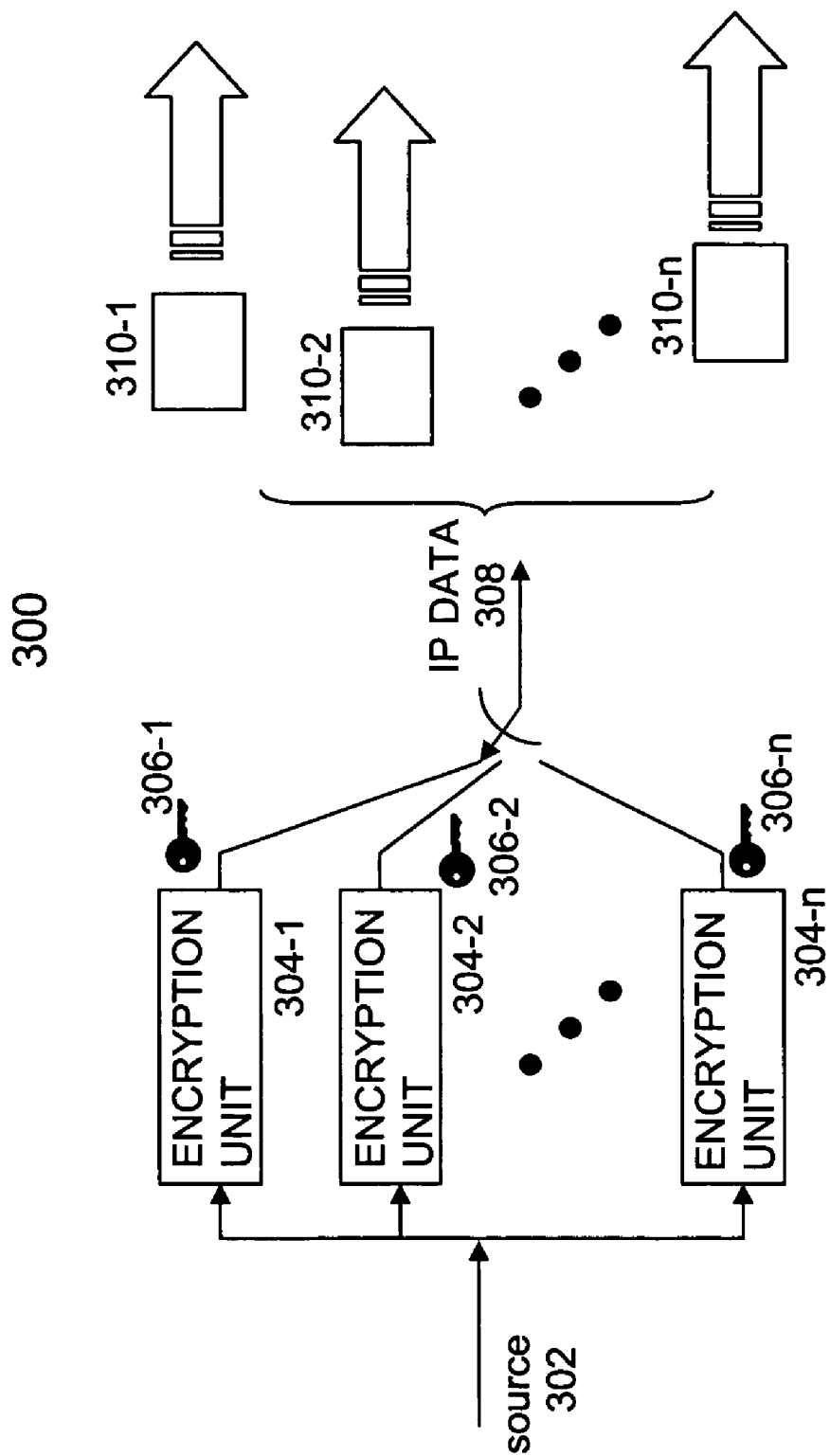

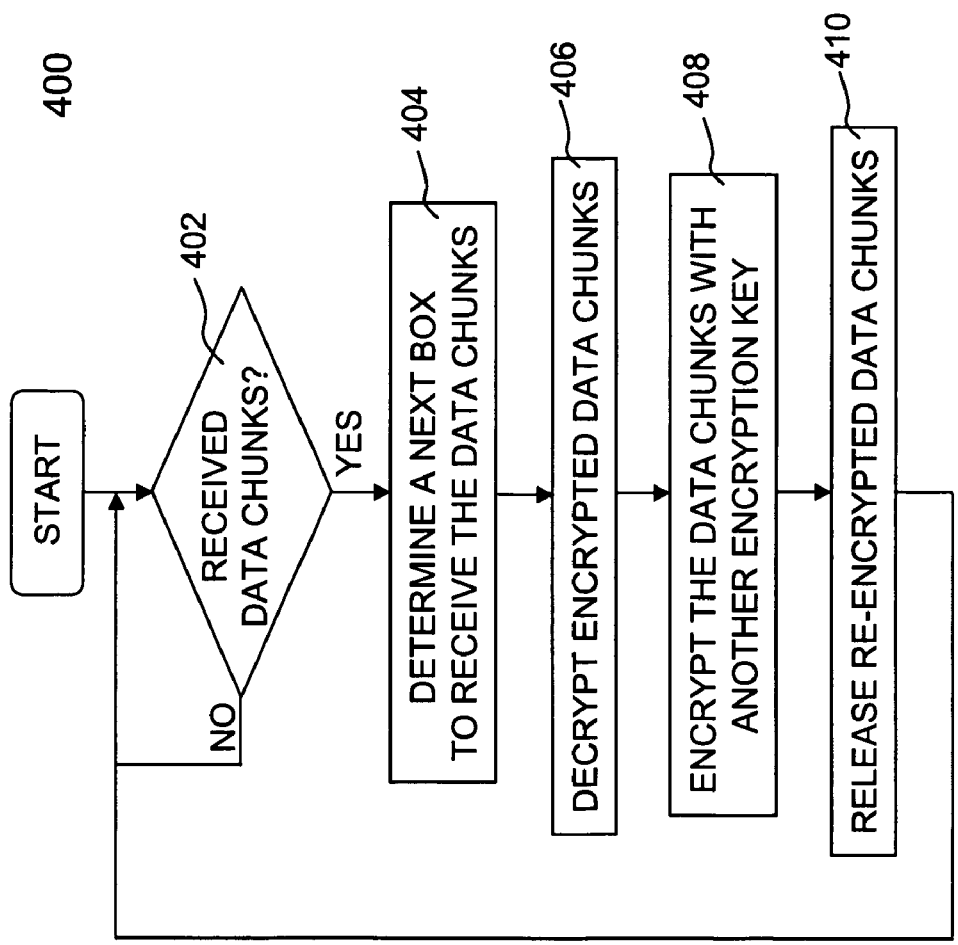

SECURED SEEDING OF DATA IN A DISTRIBUTED ENVIRONMENT

CROSS-REFERENCE TO RELATED APPLICATION

This is a continuation-in-part of U.S. application Ser. No. 11/076,334, entitled "Method and system for keeping a library of titles updated" and filed Mar. 9, 2005 now U.S. Pat. No. 7,627,888, and by at least one of the co-inventors herein.

BACKGROUND

1. Technical Field

The present invention is generally related to multimedia delivery over the Internet. Particularly, the present invention is related to techniques of securing pieces of data or data segments that are distributed in client machines.

2. Description of the Related Art

U.S. application Ser. No. 11/076,334 describes a distributed architecture in which data for a multimedia title (e.g., a movie) is fragmented into a plurality of segments that are then distributed into client machines in services. Despite a unique way to fragment the data for a title, each of these segments is distributed to one or more of the client machines. When an order is received from an ordering machine that locally caches none or at least one but not all of the segments for the title, a set of other client machines are designated to supply the missing segments to the ordering machine. While playing back the title, the missing segments are concurrently streamed in and reassembled in the ordering machine to continue the playback of the title.

When there are a large number of subscribers, there must be many client machines in service. It is noticed that more than one client machine may have an identical copy of a segment of a title, and, as a result, there are more than one distributed copies of the title collectively in all the client machines. Although the data for the title or each segment is encrypted, if a malicious user somehow obtains a corresponding decryption key(s), he may compromise the encryption of all segments of the title from a group of client machines. Consequently, data for other titles offered in a library is subject to a possible attack from the malicious user (i.e., attacker).

One way for an attacker to obtain a decryption key(s) or initiate an abusive process may be briefly summarized as follows:

The attacker orders a title from his authenticated box that initiates a request to a server.

The server ensures that the missing segments for the title are downloaded to the attacker's box.

The server provides the decryption key(s) to the attacker's box in a form such that only a trusted agent (e.g., smart card, secure microprocessor, secure software) on that box is able to read the keys.

The attacker breaks this trusted agent and obtains the keys.

Once obtaining the keys in this fashion (or some other way), the attacker could use them in many different ways. For example, the attacker may distribute the keys to others. With the keys, anyone can reassemble the encrypted data for a title by accessing a few client machines and reading the encrypted segments off the storage therein to recover all data for the title, and possible other titles.

U.S. application Ser. No. 11/076,334 presents one exemplary case in which distributed data may be subject to attacks. There are many other cases, especially in a distributed computing environment, that may present similar vulnerability.

Thus, there is a need for techniques to prevent a malicious user from compromising other segments corresponding to a title even if the malicious user has already obtained a decryption key(s).

SUMMARY

This section is for the purpose of summarizing some aspects of embodiments of the present invention and to briefly introduce some preferred embodiments. Simplifications or omissions in this section as well as the title and the abstract of this disclosure may be made to avoid obscuring the purpose of the section, the title and the abstract. Such simplifications or omissions are not intended to limit the scope of the present invention.

Broadly speaking, the invention relate to techniques for seeding data among client machines, also referred to as boxes herein. To prevent the data distributed among the boxes from being illegitimately accessed, according to one aspect of the present invention, each box is configured to perform what is referred to herein as a transcription process. In other words, when encrypted data is received, the data is decrypted and then re-encrypted with a key agreeable with a next box configured to receive the data.

According to another aspect of the present invention, segments pertaining to data for a title are distributed among the boxes, wherein each of the segments misses a certain number of data groups, each of which is small in size. As a result, the segments are largely unusable. When an authenticated box is used to place an order of the title, the box is configured to receive the data groups all at once or sequentially as the segments are streamed in. The data groups complement the received segments to support a playback of the title.

Embodiments of the invention may be implemented in numerous ways, including a method, system, device, or a computer readable medium. Several embodiments of the invention are discussed below. In one embodiment, the invention provides a method of seeding media content, the method comprises determining a next box to receive data chunks after the data chunks are received, decrypting the data chunks and re-encrypting the data chunks with a key agreeable with the next box, and causing to release the data chunks to the next box. The data chunks are originally prepared in a server, the data chunks representing at least a portion of one of segments that further represent data for a title, wherein data in each of the segments is non-consecutive in a sense that all segments must be streamed in at substantially same time and then multiplexed to reassemble the data for the title before the title can be successfully played back.

According to another embodiment, the invention provides a method of seeding media content, the method comprises distributing segments representing data of a title among boxes in services, wherein each of the boxes locally caches none, or at least one of the segments, each of the segments misses a certain number of data groups such that illegal possession of the segments would not support a playback of the title; and causing an ordering box to receive the certain number of data groups after the ordering box is verified to be an authenticated client, wherein the ordering box is placed an order for the title and configured to receive the segments from other designated boxes.

According to still another embodiment, the invention provides a system for seeding media content, the system comprises a server configured to prepare data chunks that represent at least a portion of one segments pertaining to data for a title, wherein the data chunks are encrypted with a key agreeable with one of seeding boxes configured to receive the data chunks; and a plurality of boxes in service, a small number of the boxes designated to be the seeding boxes, the one of the boxes decrypting the data chunks upon receiving the data chunks from the server, and re-encrypting the data chunks with a key agreeable with a next box configured to receive the data chunks.

One of the objects, features, and advantages of the present invention is to provide various techniques related to secure seeding of data distributed among computing devices on an open network.

Other objects, features, and advantages of the present invention will become apparent upon examining the following detailed description of an embodiment thereof, taken in conjunction with the attached drawings.

BRIEF DESCRIPTION OF THE DRAWINGS

The invention will be readily understood by the following detailed description in conjunction with the accompanying drawings, wherein like reference numerals designate like structural elements, and in which:

FIG. 1 shows a distributed video delivery system according to one embodiment of the present invention.

FIG. 2A, according to one embodiment, a file is being organized or fragmented in terms of four segments;

FIG. 2B shows another embodiment in which a file is being organized or fragmented in terms of a header and four segments, where the header is always locally cached;

FIG. 2C shows a data stream representing a file or a majority of a file, the file is being divided into four segments;

FIG. 3A shows an exemplary configuration that includes an array of encryption units that may reside in or coupled to a delivery system, such as the server of FIG. 1;

FIG. 4 shows a flowchart or process of secure seeding data across boxes in service;

DETAILED DESCRIPTION OF THE INVENTION

Figure 3B:
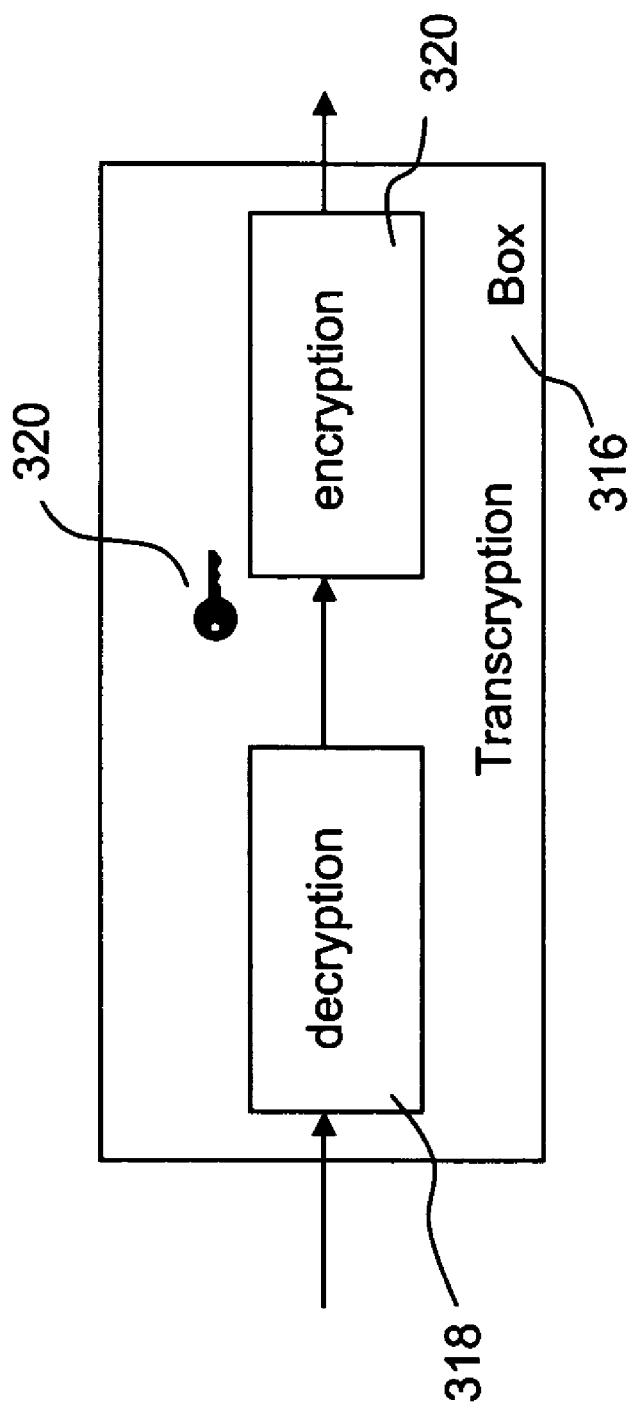
FIG. 3B shows a client machine (e.g., a box) includes a decryption unit and an encryption unit.

In the following description, numerous specific details are set forth to provide a thorough understanding of the present invention. The present invention may be practiced without these specific details. The description and representation herein are the means used by those experienced or skilled in the art to effectively convey the substance of their work to others skilled in the art. In other instances, well-known methods, procedures, components, and circuitry have not been described in detail since they are already well understood and to avoid unnecessarily obscuring aspects of the present invention.

Reference herein to "one embodiment" or "an embodiment" means that a particular feature, structure, or characteristic described in connection with the embodiment can be included in at least one implementation of the invention. The appearances of the phrase "in one embodiment" in various places in the specification are not necessarily all referring to the same embodiment, nor are separate or alternative embodiments mutually exclusive of other embodiments. Further, the order of blocks in process, flowcharts or functional diagrams representing one or more embodiments do not inherently indicate any particular order nor imply limitations in the invention.

Embodiments of the present invention are discussed herein with reference to FIGS. 1A-6. However, those skilled in the art will readily appreciate that the detailed description given herein with respect to these figures is for explanatory purposes only as the invention extends beyond these limited embodiments.

Shown as FIG. 2A of U.S. patent application Ser. No. 11/076,334, FIG. 1 herein shows an exemplary configuration 200 of a distributed network system 100. A server 202, presumably managed and/or populated by a service provider, is configured to handle the delivery of video (or multimedia) services to users via local machines or boxes 206-1, 206-2, . . . 206-n. Different from the prior art system that delivers video data to a subscriber upon receiving a request therefrom, the server 202 is not responsible for delivering the content in response to a request from a user, and instead is configured to provide source information as to where and how to retrieve at least some of the content from other boxes. In other words, a server in a prior art system requires a media storage device coupled thereto to provide the content when a client device is being serviced, while the server 202 does not need necessarily a media storage device coupled there to provide the content. Instead, some of the boxes 206-1, 206-2, . . . 206-n are respectively configured to supply part or all of the content to each other.

According to one embodiment, when fulfilling a request from a local machine or a box (e.g., 206-1), communication between the server 202 and the box 206-1 over the network paths 208-1 and 210 may be limited to small-scale requests and responses (e.g., of small size and very short). A server response to a request from a box may include source information (e.g., identifiers), authorization information and security information. Using the response from the server 202, the box may be activated to begin playback of a title (e.g., 207-1). Substantially at the same time, the box may initiate one or more requests to other boxes (e.g., 206-2 and 206-n) in accordance with the source identifiers to request subsequent portions of the title (e.g., 207-2 and 207-n). Assuming proper authorization, the requesting box receives the subsequent portions of the data concurrently from the other boxes. Because of box-to-box communication of content, the bandwidth requirement for box-to-server communications over the network paths 208-1 and 210 is kept low and typically short in duration. In the event there are a large number of user boxes issuing playback requests substantially at the same time, the bandwidth of the backbone path 210 should be sufficient to avoid noticeable or burdensome delay.

The contents available in a library being offered in any of the boxes 206-1, 206-2, . . . 206-n are originally provided by one or more content providers. Examples of the content providers include satellite receivers, television relay stations, analog or digital broadcasting station, movie studios and Internet sites. Depending on implementation, the contents may be initially received or originated in the server 202. Instead of maintaining and managing the content in a large storage device, the server 202 is configured to distribute the content or files to a plurality of local machines registered with the server 202. The boxes 206-1, 206-2, . . . 206-n shown in FIG. 2A are examples of local machines in service. Unless there is a need for a backup copy, the server 202 at any time has no need to keep a copy of the content. On the other hand, unless there is a special need to keep a complete copy of an extremely high-demand title in a box, none of the boxes in service has a complete copy of a title until an order is placed. Consequently, with embedded security in the distributed objects, some embodiments of the present invention may alleviate the concern of electronic piracy and widespread distribution (e.g., by hacking or illegal duplication).

For convenience, it is assumed herein that a file pertaining to a title is played back when the title is selected and ordered by a user. When an order for a title is placed, a corresponding file must be available for playback. One of the features in the system 200 is that a file, or at least a portion thereof, regardless of its size, can be accessed instantaneously, thereby realizing instantaneous VOD. According to one embodiment, where a file is 840 Mbytes on average and a box includes a storage capacity of 300 Gbytes, a system may offer a large library of titles (e.g., 5000) for access at any time instantly. In the prior art, if the files for the titles must be stored in advance to offer instantaneous playback, the local storage of a box would have to have a capacity of 4,000 Gbytes, consequently, rendering instantaneous VOD economically impractical.

According to one aspect of the present invention, only a beginning portion (referred to as a "header") and possibly one or more tail segments of a file are locally cached in a box. Such locally cached segments are referred to as residing objects or segments, while segments not residing locally are referred to as distributed objects or segments. When a title is selected, the header of the corresponding file is instantly played back. During the time the header is being played, the distributed objects corresponding to the title are retrieved simultaneously from other boxes. When the header is finished, the received parts of the distributed segments being streamed in from other boxes is combined with residing segments for the title, if any, to enable a continuous playback. Depending on the popularity and concurrent demand for a particular title, the number of residing objects may be increased or decreased to control the dependency of each box on other boxes for playback. Typically, the more residing segments for a title a box has, the more distributed copies of the title there are in the entire system and thus the less dependency of the ordering box on the other boxes.

In one embodiment, the header is always played first to ensure an instant playback. In another embodiment, the header size is reduced to zero, in which case, a time-fill program may be played first to provide a time frame that is sufficient enough to fetch and assembly the beginning data portion of the segments either locally available or from other boxes. Depending on implementation, the time-fill program may include one or more trailers related to the title being ordered, various notifications/updates or commercial programs. The time-fill program may be locally configured. In one embodiment, the time-fill program is provided to give a time frame in which data being fetched from one or more other devices can be stabilized. In another embodiment, the time-fill program provides a platform for sponsors that hope to display their respective programs to audience. Orders or slot positions for these programs in a time-fill program may be auctioned.

Referring to FIG. 2A, there shows an embodiment in which a file 220 is being organized or fragmented in terms of four segments 224. In general, the file 220 representing a collection of all data pertaining to a title may be divided into any number of segments in consideration of a required transmission rate (e.g., related to the encoding and decoding rates for successful playback), and the minimum uploading and downloading capabilities of a network, or even dynamically and adaptively selected depending on the selected serving boxes at run-time and in real-time during the transmission. FIG. 2B shows another embodiment in which a file 230 is being organized or fragmented in terms of a header 232 and four segments 224, where the header 232 is always locally cached. One of the advantages of having a header locally cached is to facilitate an instantaneous playback after a movie is ordered. While the header is being played back, the needed segments are retrieved from other designated boxes. It can be appreciated the length of a header may be predefined or dynamically determined to provide a time buffer (e.g., 5 minutes) sufficiently to retrieve part of the data from the distributed segments for assembling with that of any locally cached segments, if any. As a result, an instantaneous VOD system may be realized.

FIG. 2C shows a data stream 240 representing a file or a majority of a file. The file 240 is divided into four segments 247-250. The segments 247-250 are created or formed by respectively sampling the file in a decimated manner. As a result, each of the segments includes a plurality of data blocks. Depending on an exact data length of the file 240, an n-th data block in each of the segments 247-250 is four successive data blocks in the file. In one embodiment, a data block comprises a chunk of data, for example, 256 Kbytes or 1 Mbyte.

As shown in FIG. 2C, the data stream 240 is expressed in data blocks as follows: b11, b21, b31, b41, b12, b22, b32, b42, b13, b23, b33, b43, . . . b1n, b2n, b3n, b4n. With the decimated sampling, the four segments 247-250 obtained can be respectively expressed as follows:

Segment 1={b11,b12,b13,b14 . . . };

Segment 2={b21,b22,b23,b24 . . . };

Segment 3={b31,b32,b33,b34 . . . }; and

Segment 4={b41,b42,b43,b44 . . . }.

It should be noted, however, a header, if used, includes data blocks that must be consecutive so that an instantaneous playback of the header is possible. It is evident that the data blocks in the segments are non-consecutive, interlaced or interleaved.

To distribute the segments among the boxes in service, U.S. application Ser. No. 11/076,334 has described techniques of propagating the segments in form of data chunks from boxes to boxes. According to one embodiment, after the segments are prepared at a server, a first set of boxes is selected as seeding boxes. Each of the seeding boxes is configured to receive one or more data chunks from the server and then caused to propagate at least some or all of the received data chunks to a set of the boxes, wherein each of the set of the boxes is caused to recursively propagate its received data chunks to other boxes. These other boxes are chosen to continue spreading some or all of the received data chunks among the boxes till each of the boxes in service has received a designated portion of the data chunks.

According to one embodiment of the present invention, referring now to FIG. 3A, there shows a configuration 300 that includes an array of encryption units 304 that may reside in or coupled to a delivery system, such as the server 202 of FIG. 1. The encryption units 304 receive a data source 302 (e.g. for a title), each of the encryption units 304 is configured to encrypt one segment of the data source 302. For example, the data source 302 is determined to be partitioned into m segments, each of the segment is encrypted by one of the encryption units 304 with an encryption key 306-1, 306-2, . . . or 306-n. Depending on implementation, the encryption keys 306-1, 306-2, ... and 306-*n* may be identical or different. As described herein, each of the segments is encrypted by an encryption key agreeable to a receiving box. It is possible in an embodiment that some of the segments need not be encrypted in which case illegal possession of all segments would be still difficult to facilitate a playback of the title.

The encryption key 306-1, 306-2, ... or 306-*n* corresponds to one of seeding boxes 310. In other words, for example, a segment encrypted by a key 306-2 can only be decrypted by a decryption key in the box 310-2. On the other hand, as shown in FIG. 3B, each of the seeding boxes 310 includes a decryption unit 318 and an encryption unit 320. Upon receiving a specifically encrypted segment, provided that the segment needs to be propagated to a next box, the encrypted segment is decrypted in the decryption unit 318 and re-encrypted in the encryption unit 320 with an encryption key corresponding to the next box. Thus the box 316 finishes what is referred to as a transcryption process before a received segment is fetched by, or delivered to a next box.

One of the advantages of conducting the transcryption process in a box is that, even if one of more of the boxes 310 are not trusted (hence not allowed to view decrypted segments) the transcryption operation carried in a single and atomic step renders the boxes unable to view the intermediate data created after decryption but before re-encryption.

In one embodiment, the input to the transcryption operation includes a decryption key used to decrypt a received segment and an encryption key used to re-encrypt the just decrypted segment. Both keys are provided directly from a server to the box in a secure form that the (untrusted) box cannot extract the decryption key alone out of it and use the decryption key to merely decrypt the segment without re-encrypting it.

Many other different approaches may be used to transfer the transcryption inputs securely. In one embodiment, each box has a unique secret key embedded within it which may only be utilized by trusted and secure hardware or software. The inputs to the transcryption operation are concatenated together by the server and encrypted using this unique secret (or a public key compatible with this unique secret) before being passed on to the box. Since only trusted hardware/software on the box can decrypt this input, the untrusted components in the box cannot extract the decryption key contained in the input. In another embodiment, the encryption key or decryption key may be exchanged between two boxes that are engaged to propagate the data chunks.

Referring now to FIG. 4, there shows a flowchart or process 400 of secure seeding data across boxes in service. The process 400 may be implemented in software, hardware or a combination of both as a method, a process, a device or system. The data may represent a movie title. As described, a file, for example 800 Mbytes, representing the data is segmented into a number of segments. It is assumed that either the data has already encrypted or the segments have been respectively encrypted. The segments are then fragmented into a plurality of data chunks. Before these data chunks are seeded in a set of seeding boxes, each of the data chunks are encrypted with a key agreeable with one of the seeding boxes designed to receive the encrypted data chunks.

Thus at 402, the process 400 goes to check whether the encrypted data chunks are received. For example, a box, either one of the seeding boxes or one of the subsequent boxes, is configured to receive directly or indirectly the encrypted data chunks from a seeding box. It is assumed that the encrypted data chunks have been received in a box. The process 400 determines at 404 a next box to receive the encrypted data chunks. If should be noted that the box that just received the encrypted data chunks may propagate the encrypted data chunks to a number of boxes. Before releasing the encrypted data chunks to the next box, the box at 406 decrypts the encrypted data chunks with a key agreeable with a previous box that released the encrypted data chunks.

At 408, provided that the data chunks are to be propagated to other boxes, the decrypted data chunks are encrypted again with a key agreeable with a next box configured to receive the data chunks. In one embodiment, if the box is assigned to propagate the data chunks to n next boxes, the decrypted data chunks are encrypted n times, each with a key agreeable with one of the n boxes. In another embodiment, these n next boxes are located remotely with each other and share a same key. Thus the decrypted data chunks are encrypted only once with a key agreeable with the n boxes. In any case, the encrypted data chunks are now released to (e.g., uploaded to or fetched by) one or more next boxes. The process 400 may be conducted repeatedly among the boxes till all boxes receive none, some or all of the data chunks released from the server. It can be appreciated by now that the process 400 makes it very difficult, if not possible, to hack a box or so to illegally obtain clear data for a title.

Figure 5:
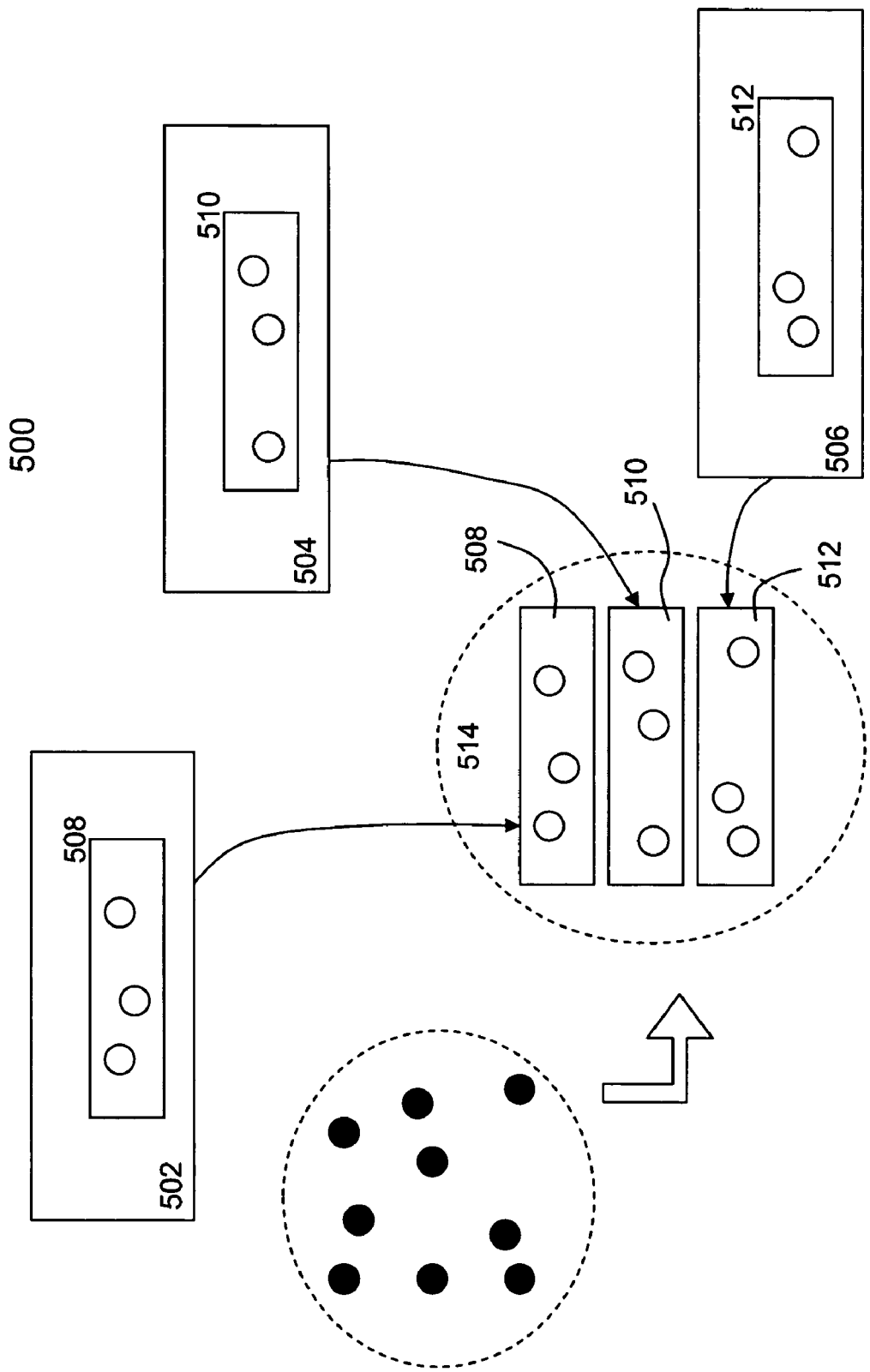
FIG. 5 shows another embodiment in which illegal possession of segments for a title could not lead to a successful playback, in particular, each or some of the data segments is provided to miss one or more discrete data portions (e.g., data holes), missing these missing data portions across a segment, although small, may render the segment practically unusable.

FIG. 5 illustrates another embodiment in which illegal possession of segments for a title could not lead to a successful playback. As illustrated, there are three boxes 502, 204 and 506 designated to supply needed segments 508, 510 and 512 to support a playback of a title placed at a box 514. Each or some of the segments 508, 510 and 512 missing one or more discrete data portions (e.g., data holes). Missing data portions across a segment, although the data portions are small in size, may render the segment practically unusable.

It is assumed that these three segments 508, 510 and 512 are all the data needed to facilitate the playback of the title. While the three segments 508, 510 and 512 are being downloaded into the box 514, a server 516 is configured to establish a secure session in which the discrete data portions are transported to the box 514 to supplement these three segments 508, 510 and 512. In other words, the box 514 is configured to use the provided discrete data portions to continue the playback of the title. It can be understood that the possession of the three segments 508, 510 and 512 would not support the playback of the title until a valid box is authenticated by a server and authorized to get the missing discrete data portions.

According to one embodiment, the discrete data portions are small in size and may be downloaded from a server after the box is authenticated. According to another embodiment, the discrete data portions are obtained sequentially as the three segments 508, 510 and 512 are streamed in. As a result, data representing a title has to be played in a box authorized by a service provider (e.g., via a server).

Figure 6:
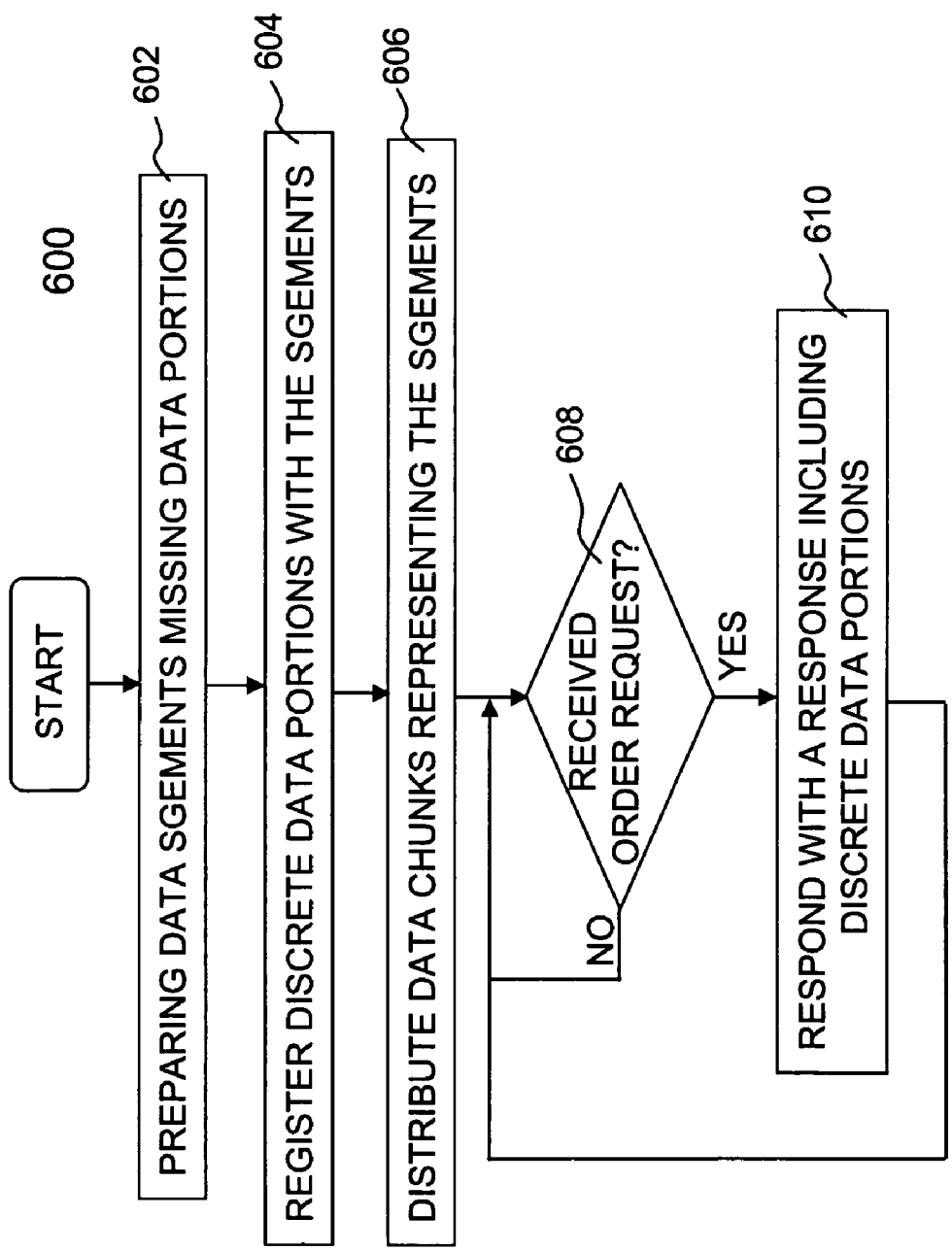
FIG. 6 shows a flowchart or process of facilitating a playback of a title from distributed segments missing some data portions.
Figure 6:
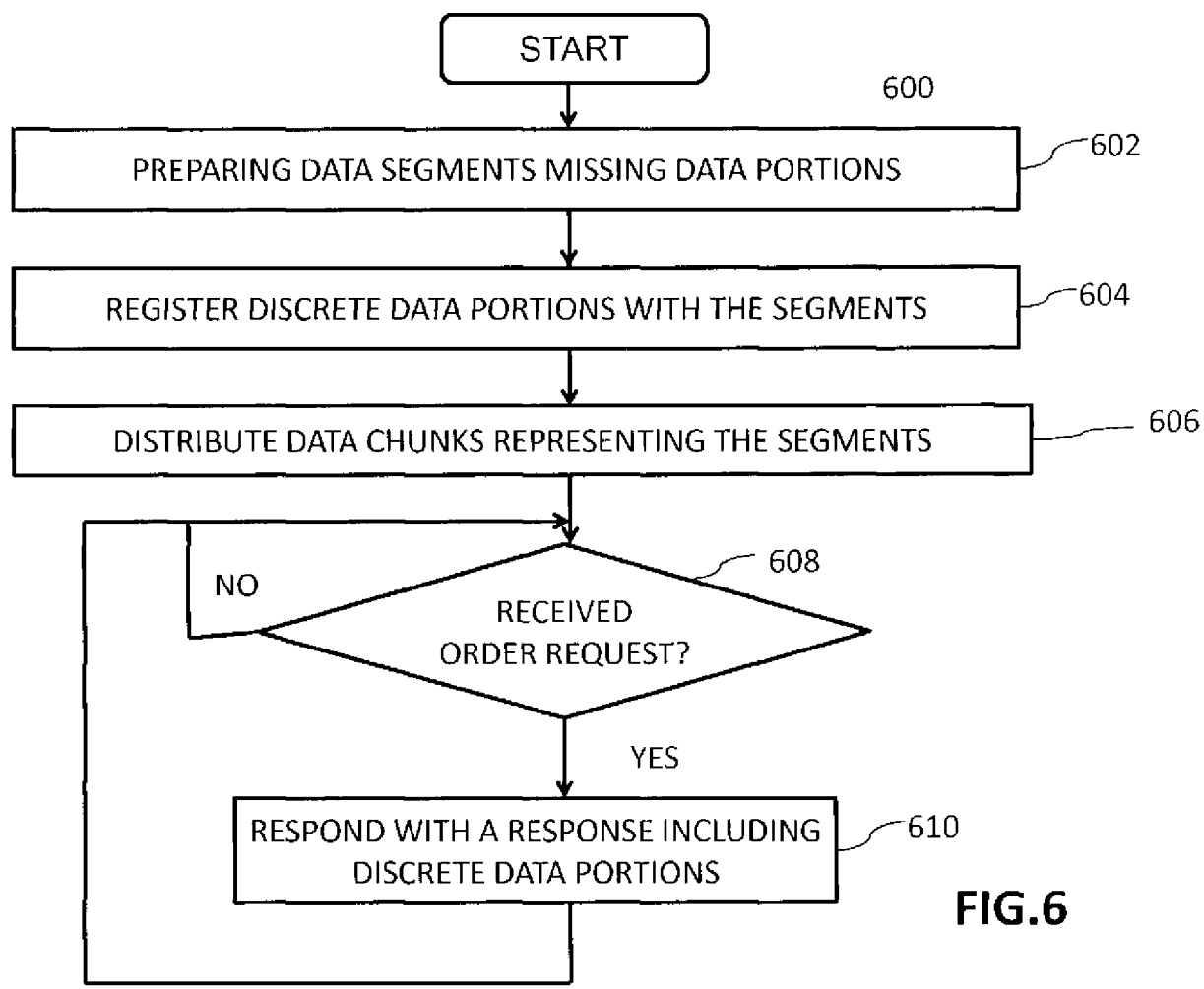

Referring now to FIG. 6, there shows a flowchart or process 600 of facilitating a playback of a title from distributed segments missing some data portions. The process 600 may be implemented in software, hardware or a combination of both as a method, a process, a device or system. The data comprising a plurality of segments may represent a movie title. However, at 602, at least one of the segments is made to miss at least one or more discrete data portions. As a result, some or all of the segments are created with "data holes", thus illegal possession of all the segments would not be able to render a successful playback of the title.

At 604, the data portions are respectively registered with the segment(s). In order words, location information as to where a data portion is taken out from a segment must be stored. If there are 10 data portions taken out from a segment, each of the 10 data portions needs to be associated with corresponding location information. Depending on implementation, the location information may correlate to the segment in terms of time or data sequence. At 606, data chunks representing the segments are started to be propagated synchronously or asynchronously across all boxes in service. As a result, each of the boxes in services caches none or at least one of the segments, wherein at least one of the segments misses one or more discrete data portions.

When a user browses a library to select a title from a box, an order request is initiated and sent to a server. It is assumed that the server has received the request at 608 and the box is authenticated, the process 600 now goes to 610 where a response is sent back to the box. According to one embodiment, the response includes respective identifiers of a set of selected boxes from which the ordering box can retrieve needed segments to facilitate a playback of the ordered title. The response also includes the discrete data portions that can complement those segments than need the discrete data portions to be complete. In general, the discrete data portions are small in size but distributed across an entire segment so that the segment becomes practically unusable without these data portions.

In operation, as the needed segments are streamed in, whenever the box detects that a data portion is needed to complement the streamed portion of the segment, the corresponding data portion is taken out from a memory to complement the data so that the playback being executed can continue.

It can be appreciated by now to those skilled in the art, a sequence of data portions each is small but can render an entire data segment unusable. As a result, illegal possession of all the segments would not be able to render a successful playback of the title.

The present invention has been described in sufficient detail with a certain degree of particularity. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the forgoing description of embodiments.

We claim:

1. A method of seeding media content in a system, the method comprising:
   determining a next device to receive data chunks after the data chunks are received by a first device;
   decrypting the data chunks and re-encrypting the data chunks with a first key that enables the next device to decrypt the data chunks;
   causing the re-encrypted data chunks to be transmitted to the next device; and causing the next device to propagate the data chunks to a plurality of devices by (i) determining the plurality of devices to receive the data chunks, (ii) decrypting the re-encrypted data chunks, and (iii) for each of the plurality of devices to receive the data chunks, encrypting the data chunks with a second key that corresponds to each of a respective one of the plurality of devices to enable each of the plurality of devices to decrypt the data chunks,
   wherein each of the plurality of devices is caused to recursively propagate its received data chunks to one or more other devices that are chosen to continue transmitting the received data chunks until each of the plurality of devices has received a designated portion of the data chunks.

2. The method of claim 1, wherein the data chunks are originally provided by a server, the data chunks representing at least a portion of one of a plurality of segments that further represent data for media content.

3. The method of claim 2, wherein data in each of the plurality of segments is non-consecutive so that the segments are streamed at substantially a same time and multiplexed to reassemble the data for the media content before the media content can be successfully played back.

4. The method of claim 2, wherein the data for the media content is encrypted or the segments are each respectively encrypted before being represented in the data chunks by the server.

5. A method of seeding media content in a system, the method comprising:
   providing data chunks that represent a plurality of data segments representing data for a title, wherein each of the data segments is non-consecutive in sequence;
   receiving encrypted data chunks;
   determining a next device to receive data chunks after the data chunks are received;
   decrypting the data chunks and re-encrypting the data chunks with a first key that enables the next device to decrypt the data chunks;
   causing the re-encrypted data chunks to be transmitted to the next device; and causing the next device to propagate the data chunks to a plurality of devices by (i) determining the plurality of devices to receive the data chunks, (ii) decrypting the re-encrypted data chunks, and (iii) for each of the plurality of devices to receive the data chunks, encrypting the data chunks with a second key that corresponds to each of a respective one of the plurality of devices to enables each of the plurality of devices to decrypt the data chunks,
   wherein each of the plurality of devices is caused to recursively propagate its received data chunks to one or more other devices that are chosen to continue transmitting the received data chunks until each of the plurality of devices has received a designated portion of the data chunks.

6. A system for seeding media content, the system comprising:
   a server configured to provide data chunks that represent at least a portion of one of a plurality of segments pertaining to data for media content, wherein the data chunks are encrypted with a first key that enables one of a plurality of seeding devices to decrypt the data chunks; and
   a plurality of devices, including a first device designated to be one of the plurality of seeding devices, the first device configured to (i) receive the encrypted data chunks from the server, (ii) decrypt the data chunks upon receiving the data chunks from the server, and (iii) re-encrypt the data chunks with a second key that enables a next device of the plurality of devices to decrypt the data chunks, the next device being determined to receive the data chunks from the first device; and
   wherein one or more of the plurality of devices are configured to propagate the data chunks to one or more other devices in the plurality of devices, wherein each of the plurality of devices is caused to recursively propagate its received data chunks to other devices that are chosen to continue transmitting the received data chunks until each of the plurality of devices has received a designated portion of the data chunks.

7. The system of claim 6, wherein data in each of the plurality of segments is non-consecutive so that all segments are streamed at substantially a same time and multiplexed to reassemble the data for the media content before the media content can be successfully played back.

8. The system of claim 7, wherein the data for the media content is encrypted or the segments are each respectively encrypted before being represented in the data chunks by the server.

9. The system of claim 6, wherein one of the plurality of devices is configured to play back the media content in response to retrieving at least some of the plurality of segments.

10. The system of claim 9, wherein the one of the plurality of devices is configured to multiplex the segments to reassemble the data for the media content.

* * * * *

UNITED STATES PATENT AND TRADEMARK OFFICE
CERTIFICATE OF CORRECTION

| | |
|---|---|
| PATENT NO. | : 8,225,083 B2 |
| APPLICATION NO. | : 11/351841 |
| DATED | : July 17, 2012 |
| INVENTOR(S) | : Prasanna Ganesan and Andrew M. Goodman |

It is certified that error appears in the above-identified patent and that said Letters Patent is hereby corrected as shown below:

In the Drawings

Delete drawing sheet 7, and replace with new drawing sheet 7. (Attached)

Signed and Sealed this
Eleventh Day of June, 2013

Teresa Stanek Rea
*Acting Director of the United States Patent and Trademark Office*